2,382,635

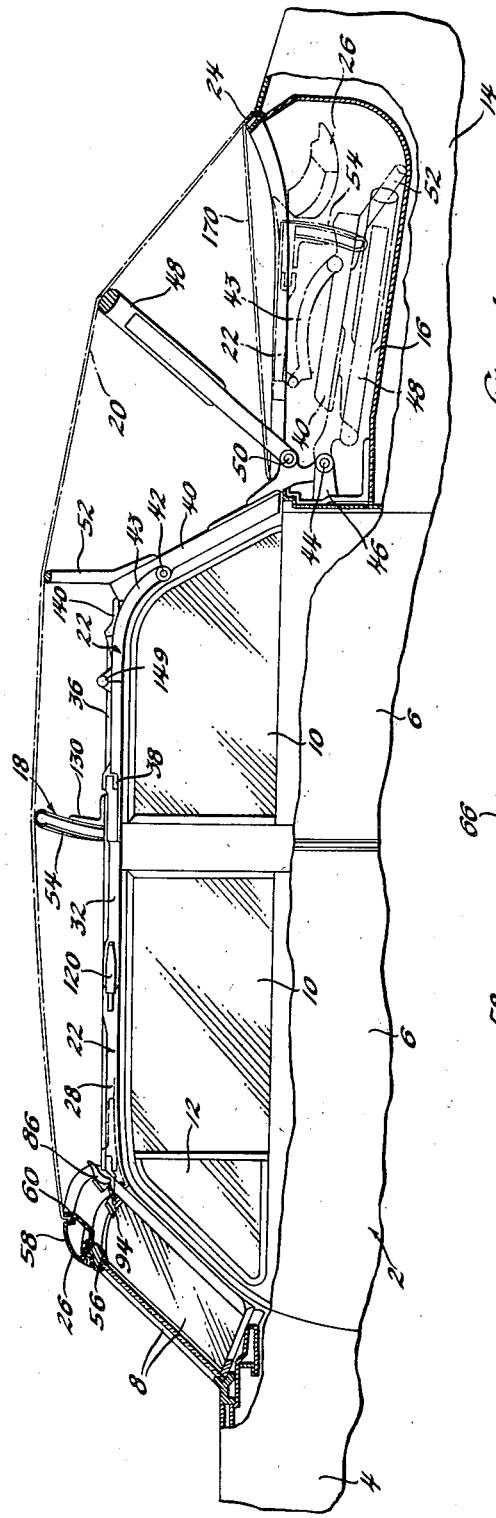
Aug. 14, 1945. F. HUMER 2,382,635
COLLAPSIBLE TOP FOR AUTOMOBILES
Filed Aug. 23, 1943 3 Sheets-Sheet 1
Inventor
Frank Humer
By Blackmore, Spencer & Hunt
Attorneys Aug. 14, 1945.   F. HUMER   2,382,635
COLLAPSIBLE TOP FOR AUTOMOBILES
Filed Aug. 23, 1943   3 Sheets-Sheet 2
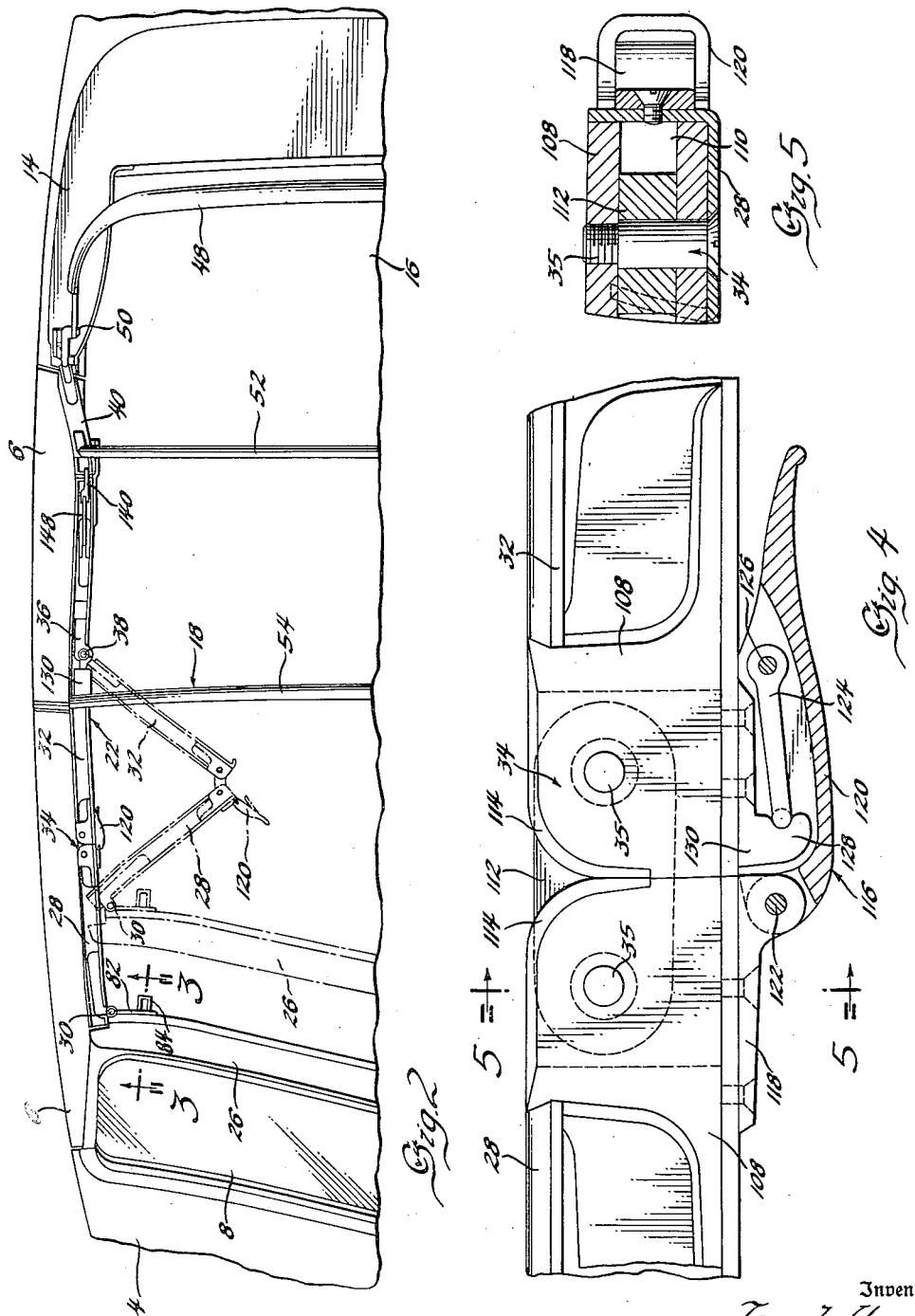
Inventor
Frank Humer
By Blackmore, Spencer & Flint
Attorneys Aug. 14, 1945.  F. HUMER  2,382,635
COLLAPSIBLE TOP FOR AUTOMOBILES
Filed Aug. 23, 1943  3 Sheets-Sheet 3
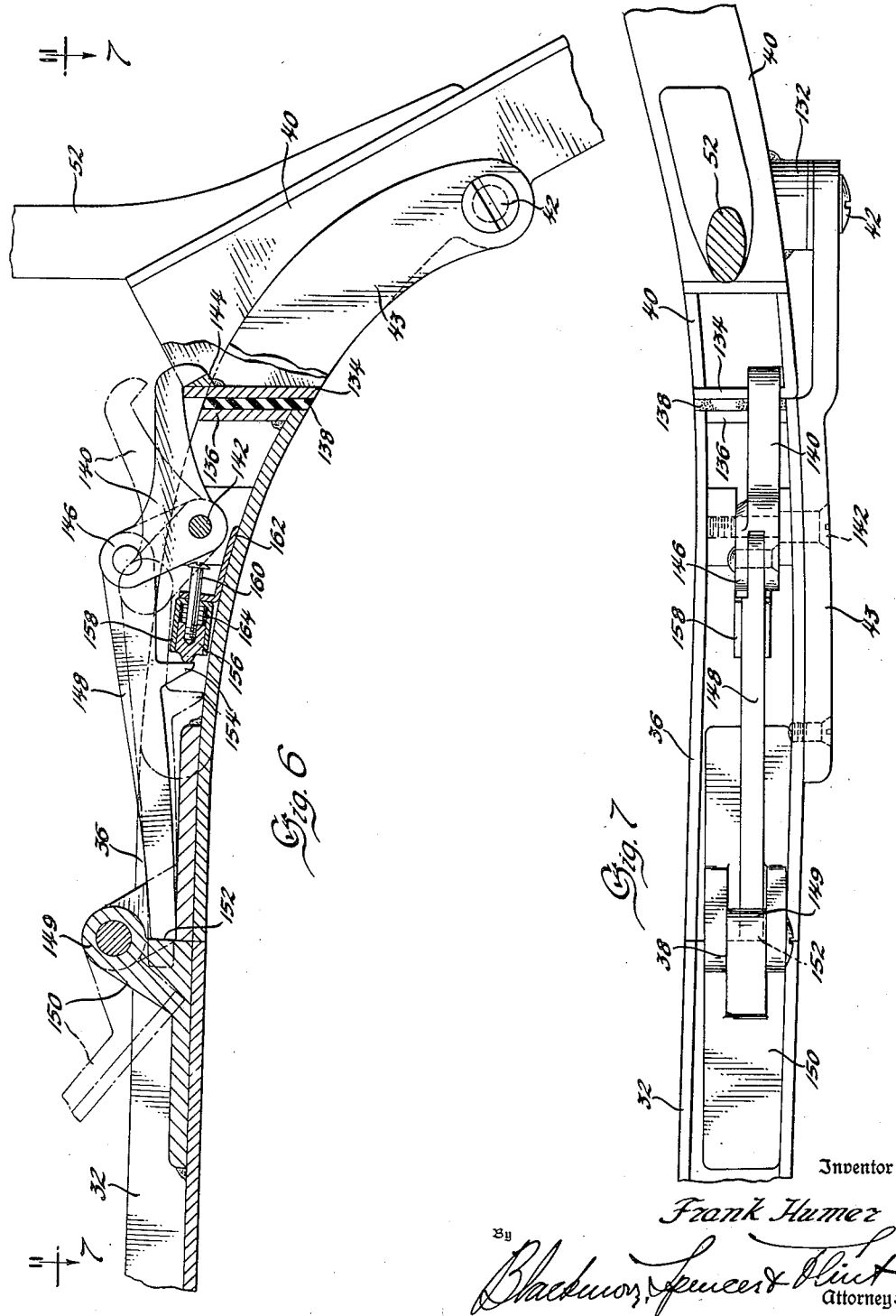
Inventor
Frank Humer
By Blackmore, Spencer & Flint
Attorneys Patented Aug. 14, 1945

UNITED STATES PATENT OFFICE 2,382,635

COLLAPSIBLE TOP FOR AUTOMOBILES

Frank Humer, Detroit, Mich., assignor to General Motors Corporation, Detroit, Mich., a corporation of Delaware Application August 23, 1943, Serial No. 499,601

3 Claims. (Cl. 296—107)

This invention relates to a collapsible top for an automobile, and particularly the supporting frame structure thereof.

The novelty of the invention consists in the connection between the rear upright top supports and the lateral horizontal top supports. The upright and lateral supports are pivotally interconnected and spring urged hooks pivotally mounted on the lateral supports engage catches in the top of the upright supports. When the top is released and the frame structure moved rearwardly, the springs move the hooks from the catches and enable the framework to fold rearwardly and be positioned in a compartment at the rear of the vehicle.

On the drawings:

Figure 1 is a side elevational view of a part of an automobile body with a part broken away and the top shown in longitudinal section in full lines and in collapsed or folded position in dotted outline.

Figure 2 is a plan view of the vehicle with the fabric of the top removed better to show the frame structure, the dotted position showing the parts in partially collapsed position.

Figure 3 is an enlarged sectional detailed view on the line 3—3 of Figure 2 of the releasable connection between the top header bar and the windshield.

Figure 4 is an enlarged sectional detailed view of the hinged connection between the forward bars or sections of the collapsible lateral frame members.

Figure 5 is a sectional view on the line 5—5 of Figure 4.

Figure 6 is an enlarged sectional detail of the connection between the rear uprights and the lateral frame member, the unlatched position of the hook being shown in dotted outline.

Figure 7 is a plan view on the line 7—7 of Figure 6.

Referring to the drawings, 2 indicates an automobile as a whole. The usual cowl is indicated at 4, the doors at 6 and the V-shaped windshield at 8. The doors 6 have the usual windows 10 and the front doors are provided with ventilating windows 12. The vehicle 2 has a rear deck 14 in which there is a compartment 16 for the reception of the top in collapsed position as shown in dotted outline in Figure 1.

The collapsible or foldable top is indicated as a whole at 18. The top comprises the fabric or outer skin 20 and the foldable frame structure 22. The fabric 20 is secured at its rear end at 24 to the edge of the pocket or compartment 16 and at its front end to the top header bar 26 which forms a part of the collapsible frame structure.

In addition to the top header bar 26, the collapsible frame structure comprises two lateral front bars 28 (one at each side) pivoted at 30 to a bracket 82 secured to the header bar; two intermediate lateral bars 32 hinged at 34 to the front bars 28; two rear lateral bars 36 hinged or pivoted at 38 to the intermediate bars 32, and two rear upright supports 40 pivoted at 42 to a member 43 rigidly secured to the rear lateral frame members 36. The rear uprights 40 are pivoted at 44 to brackets 46 suitably secured to the vehicle such as at the rear door posts.

A rear bow 48 is pivoted at 50 to the supports 40 and an intermediate bow 52 is rigidly secured to the upper part of the supports 40. A front bow 54 is rigidly secured to the rear lateral bars 36. The bows 48, 52 and 54 support the fabric 20 between its points of attachment at 24 and the header bar 26 when the top is in raised or operative position as shown in Figure 1.

Referring to Figures 1 and 3, the top header bar 26 is removably mounted on the windshield frame 56 and comprises the outer metal shield 58 and the inner metal closure member 60. The shield 58 has a channel 62 at its front. A suitable filler of wood or paper (not shown) is secured in the channel and a trim strip 64 fastened over the filler. A second channel 66 is formed at the rear of the shield and in this channel the front edge of the top fabric 20 is secured in any suitable way. The member 60 has a flange 68 secured to the channel 66 and beyond the flange the member 60 extends forwardly and downwardly as indicated at 70 and then horizontally at 72. The member 60 terminates in a downwardly facing channel 74 which has a filler of rubber 76 secured therein. The windshield frame 56 has an upwardly projecting tongue 78 which fits into the rubber filler to make a weathertight connection when the top is in operative position as shown in Figures 1 and 3.

The member 60 has reinforcing irons 80 secured on the inside thereof and on the outside opposite the irons 80 are secured the brackets 82 having a U-shaped arm 84. A lever 86 is pivoted at 88 in the U-shaped arm, and a U-shaped latch 90 is pivoted at 92 to the lever 86. The pivot 30 (Figure 2) is mounted on the bracket 82.

The windshield frame 56 has a bracket 94 secured thereto and this bracket has a hook 96 over which there is received the latch 90 as shown in Figure 3. In the latched position in Figure 3, the pivot 92 is overcenter with reference to the pivot 88, firmly to hold the header 26 on the windshield frame 56.

The reinforcing iron 80 has an opening in which there is rigidly secured the shank end 98 of a pilot pin 100. The pin has a point 102 which is received in a recess 104 in the bracket 94 properly to position the header 26 on the frame 56. A wear plate 106 is secured to the bracket 94.

The structure shown in Figure 3 is duplicated at each side of the vehicle.

The hinged connection 34 between the bars 28 and 32 is shown in Figure 4. The bars are channel shaped and a bracket 108 is secured in the end of each channel. The brackets are slotted where they face each other and in the slots 110 a link 112 is positioned. The vertical hinge pins 35 unite the link to the brackets. The brackets 108 are rounded at 114 to enable the bars to break inwardly of the vehicle on the pivots 30, 35 and 38.

To lock the hinge connection at 34 and prevent its breaking, a latch 116 is provided. A bracket 118 is rigidly mounted on one of the brackets 108 and a lever or handle 120 is pivotally mounted at 122 to the bracket 118.

The lever 120 extends across the joint and has a U-shaped arm 124 pivoted thereto at 126. The free end of the arm 124 is adapted to engage with a hook 128 formed integral with a bracket 130 secured to the other of the brackets 108. When the parts are in the position shown in Figure 4, the pivotal axis of 126 is over center with reference to the line of the pivots 122 and the arm 124 in its hook 128. The latch is released by pulling on the end of the lever 120 to move it to the dotted line position shown in Figure 2. In the latched position the pivoted end of the handle fits snugly against the hook 128.

The pivot at 38 between the bars 32 and 36 is to the rear of the bow 54. The ends of the bow 54 are secured to forward extensions of the bars 36 beyond the pivot 38. Angle irons 130 (Figure 1) secure the bow 54 to the extensions.

Referring to Figures 6 and 7, the member 43 is illustrated as rigidly secured to the bar 36 and pivoted at 42 to the support 40. A spacer 132 is placed between the member 43 and the support 40 at the pivot. The upper end of the support 40 is shaped at 134 to conform to a shaped end 136 on the bar 36 and a piece of rubber or of fabric 138 is secured to either of the surfaces at 134 or 136 to make a noiseless joint.

A hook 140 is pivotally mounted at 142 in the channel of the bar 36. This hook is movable into engagement with or out of engagement from a catch 144 secured to the shaped end 134 of the support 40. The hook has a forked extension 146 to which there is pivoted an arm 148 which extends rearwardly under the eye 149 of the bracket 150 which forms a part of the joint or hinge 38. In the operative position of the parts as shown in full lines in Figures 6 and 7, the end 152 of the arm 148 abuts against the bracket 150.

The arm 148 has a downwardly extending finger 154 acted on by a piston 156 mounted in a cylinder 158, secured in the channel of the bar 36. A screw 160 passes through a small bracket 162 and through the bottom of the cylinder and is screwed into the piston 156. The head of the screw limits the travel of the piston. A spring 164 is housed in the cylinder 158 and always urges the piston out of the cylinder and the arm to the dotted line position of the parts in Figure 6.

When the hook 140 is in engagement with the catch 144 the support 40 and bar 36 are held rigidly together, but when the hook is disengaged the support and bar will break at parts 134 and 136 and move on the pivot 42.

The full line position shown in all of the figures of the drawings is the operative position, or the position taken when the top is raised. To collapse or fold the top into the rear pocket 16, the following steps or procedure is necessary: The handles 86 (Figure 3) at the two sides of the vehicle are moved downwardly to release the latches 90 from the hooks 96. The levers 120 (Figure 4) are also released to disengage the arms 124 from the hooks 128. The top header bar 26 is now raised to move the pilot pins 100 from the recesses 104. The header bar is now moved rearwardly by causing the joints at 34 to break and move the bars 28 and 32 inwardly of the vehicle. The fabric 20 will fold of its own accord and the continued movement of the header bar rearwardly will cause the bars 28 and 32 to abut lengthwise. The header bar 26 is now raised and moved backward toward the pocket 16. The raising movement will break the hinges at the pivots 38 and enable the springs 164 to move the arms 148 and hooks 140 to the dotted line position in Figure 6. The bars 36 can now move on their pivots 42 and the continued movement of the header bar rearwardly will cause the supports 40 to move on their pivots 44 to collapse or fold the top to the dotted line position shown at the right of Figure 1. The bows 54 and 52 will follow the movement of the bars 36 and the supports 40, respectively, to which they are rigidly connected. The bow 48 will move of its own accord on its pivot 50.

For the reverse operation, or the movement from the dotted line position of Figure 1 to the full line position, the operator seizes the header bar 26 and moves it upwardly and forwardly. The folded bars 28 and 32 will align to stretch the fabric 20. The bars 32 will pull the bars 36 which in turn pull the supports 40 around their pivots 44. When the hinges at the joints 38 straighten they will push the arms 148 to cause the hooks 140 to engage over the catches 144 and rigidly unite the bars 36 and the supports 40. When the header bar is near the windshield frame, the levers 120 are moved to the position of Figure 4. The header bar is now forced over the windshield frame 56 and the pilot pins 100 placed in the recesses 104. The levers 86 are now moved upwardly to the full line position shown in Figure 3 to cause the latches 90 to engage with the hooks 96. This will press the header bar on the windshield frame 56 and compress the rubber 76.

A cover 170 is shown in dotted lines in Figure 1. This cover can be drawn over the top when it is in collapsed position as shown in Figure 1.

I claim:

1. In a collapsible frame structure for the folding fabric top of an automotive vehicle, a pair of upwardly extending supports pivoted at their lower ends to the rear part of the vehicle, lateral forwardly extending frame members pivoted to the upper ends of the supports, a catch in the end of each support, hooks pivotally mounted on each lateral frame member, said hooks being adapted to engage with the catches to hold the supports and lateral members rigidly together when the top is in operative position, springs constantly urging said hooks out of engagement with the catches, means to prevent the springs from moving the hooks when the parts are in operative position, said lateral frame members extending to the front of the vehicle and being releasably secured to the windshield frame, the release of the front part of said structure from the windshield frame enabling the structure to be folded rearwardly of the vehicle, the rearward folding of the structure enabling the spring to move the hooks away from the catches to enable the lateral frame members to fold on the supports.

2. In a collapsible frame structure for the fabric top of an automotive vehicle, a pair of upwardly extending supports pivoted at their lower ends to the rear part of the vehicle, top supporting bows secured to said support, lateral forwardly extending interpivoted frame members extending to the front part of the vehicle and being releasably secured to the top of the windshield, the rearwardmost of said members having hooks pivotally mounted thereon, catches in the upright supports in which the hooks are adapted to engage to hold the rearwardmost elements rigidly to the supports, an arm pivoted to each hook and abutting against a stop on the rearwardmost element, the end of said arms being against the stop and preventing the hook from becoming disengaged from the catches when the top is in operative position, springs urging said hooks out of their catches, said structure being foldable rearwardly of the vehicle when the forward end is released, and said arm moving away from its stop when the members are folded to enable the springs to release the hooks from the catches.

3. In a collapsible frame structure for the fabric top of an automotive vehicle, upright supports pivoted to the lower end of the vehicle, catches in the upper ends of the supports, lateral frame elements extending forwardly of the supports and extending to the windshield of the vehicle and being releasably secured thereto, the rearwardmost of said elements being pivotally connected to the supports, hooks pivoted to said rearwardmost members and adapted to engage with the catches rigidly to connect the lateral members to the supports, arms secured to said hooks and extending forwardly of the vehicle, the ends of said arms striking an abutment when the top is in operative position to prevent the withdrawal of the hooks from the catches, a finger on each arm, a spring for each finger constantly urging the arm forwardly to move the hook to withdraw it from its catch, said spring being able to withdraw the hook from the catch when the lateral elements are moved on their pivots to enable the structure to be moved rearwardly to collapse the top at the rear of the vehicle.

FRANK HUMER.